United States Patent [19]
Coffey et al.

[11] 3,841,449
[45] Oct. 15, 1974

[54] CLUTCH WITH VACUUM RELEASE MOTOR

[75] Inventors: James M. Coffey, El Segundo; Clifford H. Lang, Los Angeles, both of Calif.

[73] Assignee: Cybergenics Inc., Los Angeles, Calif.

[22] Filed: Aug. 29, 1972

[21] Appl. No.: 284,609

[52] U.S. Cl.............. 192/3.59, 192/91 R, 91/376, 285/363, 285/150
[51] Int. Cl............................................ F16d 25/08
[58] Field of Search............ 192/91 R, 3.59; 91/376

[56] References Cited
UNITED STATES PATENTS

| | | | |
|---|---|---|---|
| 1,801,483 | 4/1931 | Bragg et al.......................... | 91/376 |
| 2,058,313 | 10/1936 | Hill................................ | 192/3.59 X |
| 2,107,357 | 2/1938 | Wood............................ | 192/91 R X |
| 2,144,022 | 1/1939 | Kliesrath........................... | 192/3.59 |
| 2,215,716 | 9/1940 | Price et al...................... | 192/91 R X |
| 2,735,268 | 2/1956 | Stelzer............................. | 91/376 X |
| 3,083,804 | 4/1963 | Bland et al....................... | 192/91 R |

*Primary Examiner*—Benjamin W. Wyche
*Attorney, Agent, or Firm*—Harry Kotlar; Lewis B. Sternfels

[57] ABSTRACT

The clutch controller is useful in a manually shiftable automobile. Depression of a push-button in the gear shift lever proportionally controls the extent of clutch engagement and disengagement through a vacuum actuator. The actuator comprises a closed can which is separated into a pair of chambers by a movable piston. The piston is secured to the clutch actuating arm. One chamber is connected to the intake manifold. The second chamber is connectable to the atmosphere through a first leader-follower valve. Communication between the two chambers is by a second leader-follower valve. Both valves are secured to and operable by depression of the pushbutton. When the first valve is opened, the second chamber opens to the outside atmosphere, so that the differential pressure between the first and second chambers moves the piston to close the first valve; the piston movement being proportional, therefore, to the distance the push-button is depressed. Since the piston is connected to the clutch, the clutch is also proportionally moved. Upon closure of the first valve, movement of the piston ceases. Upon release of the button, the second valve opens to permit communication between the first and second chambers and tends to equal the pressures therebetween. The clutch spring then moves the piston back a proportional amount that the button is released. Connection of the vacuum actuator to the intake manifold and the carburetor is by a special attachment which utilizes the normal flange connection between the carburetor and the intake manifold.

14 Claims, 8 Drawing Figures

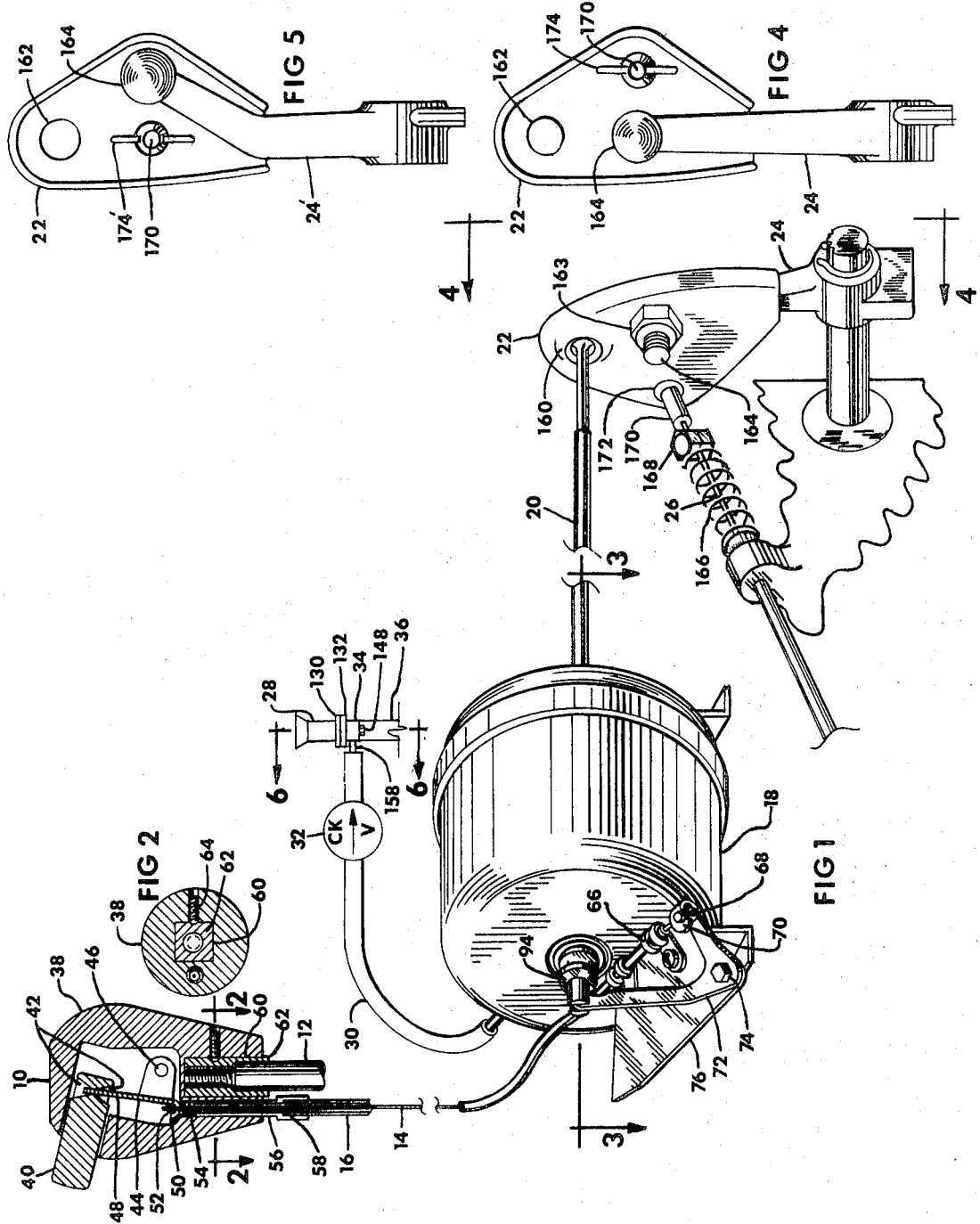

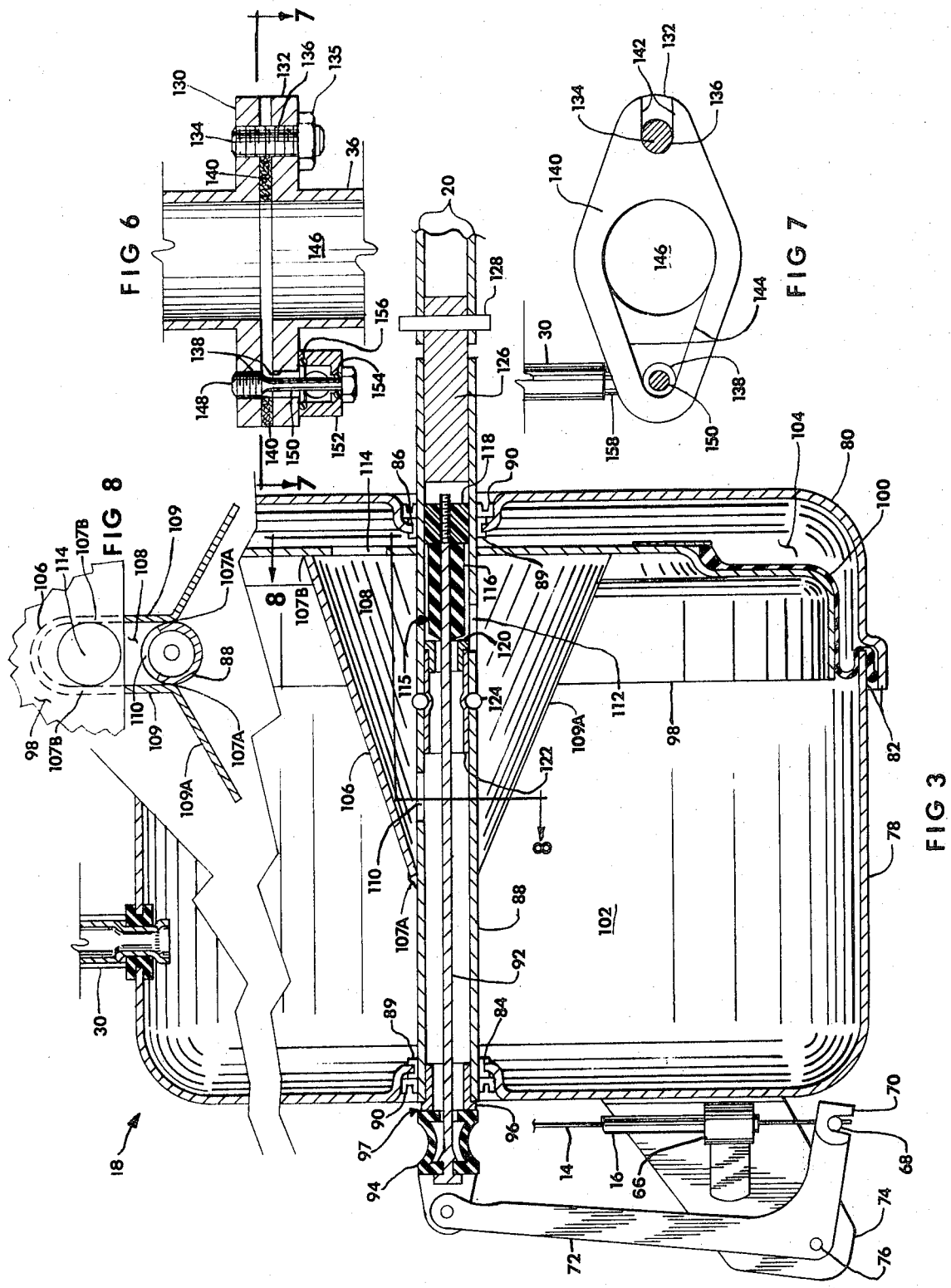

CLUTCH WITH VACUUM RELEASE MOTOR

The present invention relates to a means of controlling an automotive clutch from the gear shift lever in a manually shifted automobile without disturbing the foot pedal clutch control.

Devices for controlling clutches are well known in the art, but generally comprise power-assist mechanisms which aid in the changing of gears. As a consequence, once placed into operation, they continue to operate until a gear change has been completed and cannot be changed once operation has commenced. In no case are such prior art devices proportional; that is, in no prior art device does movement of the actuator produce a corresponding proportional movement of the clutch.

Such proportional devices are quite useful, for example, in heavy traffic where frequent stops and starts are made. Many vehicle operators become quite fatigued, or at least annoyed, at continual depression of the clutch pedal and continual changes of the gears. In some cases, in fact, operator's manuals recommend that the vehicle be placed in neutral when the engine is idling, such as at a stop light. Many operators find this practice an inconvenience and place their automobiles into the desired gear, causing increased wear of their clutch.

The present invention overcomes or avoids these and other problems by providing a proportional clutch-operating mechanism which is intended to supplement but not replace the conventional foot pedal operated clutch. The present invention is preferably actuated by means of a push-button on the gear shift lever and depression of the push-button causes proportional operation of the clutch. The push-button operates a valve-controlled vacuum actuator having a pair of chambers separated by a movable piston. A first of the chambers is connected to the intake manifold of the carburetor, while the second of the chambers is connected to the ambient atmosphere through a first leader-follower valve. Both valves comprise a movable leader seat connected to the push-button and a movable follower seal. Pressure communication between the chambers is by a second-leader-follower valve. The vacuum actuator is operated by a negative pressure differential. A tube connects the piston to the clutch and acts additionally as an air passage between the atmosphere and the first and second chambers. As an air passage, the tube terminates in the follower seals for both valves. The connection between the tube and the second chamber is always open while the second valve is positioned between the tube and the first chamber.

When the push-button is depressed, the valve to the atmosphere is opened through movement of the leader seal away from the follower seal of the first valve, to allow air to flow into the second chamber, the second valve between the tube and the first chamber being closed. As a consequence, a pressure differential is created between the first and second chambers to cause movement of the piston. The piston and the connected tube move until the tube, and the first follower seal, seal against the leader seal of the first valve previously opened to the atmosphere. Movement of the piston and the tube actuates the clutch. Full release of the gear-shift-mounted control button opens the second valve between the chambers to equalize pressure therebetween, thereby permitting the normal clutch spring to move the piston in its reverse direction. Partial release of the button opens the second valve and so to permit air flow between the chambers, the piston and tube stopping its reverse movement when the second valve follower seal abuts the adjacent leader seal. This abutment closes the second valve, thus stopping air flow from the second chamber into the first chamber, at which point the clutch spring can no longer overcome the force arising from any existing pressure differential between the chambers.

It is, therefore, an object of the present invention to provide a proportional clutch operator.

Another object is to provide a reversible clutch operator.

Another object is to provide a device which is operable when the vehicle is accelerating or under maximum carburetor usage.

Another object is to provide a clutch actuator subject to minimum wear.

Another object is to provide a mechanism which retains use of the clutch pedal.

Another object is to provide a device which is easily installable with a minimum change of existing hardware.

These and other objects, as well as a more complete understanding of the present invention, will become more apparent upon reference to the following illustrative description of a preferred embodiment and the accompanying drawings thereof, in which:

FIG. 1 depicts in partial section the apparatus of the present invention;

FIG. 2 is a section of the push-button control taken along lines 2—2 of FIG. 1;

FIG. 3 is a cross-sectional view of the vacuum actuator of FIG. 1, taken along lines 3—3 thereof;

FIGS. 4 and 5 depict views of alternate adaptors for connection to the clutch and clutch pedal, each viewed generally in the direction of lines 4—4 of FIG. 1;

FIG. 6 is a cross-sectional view of the attachment to the carburetor and intake manifold taken along lines 6—6 of FIG. 1;

FIG. 7 is a cross-sectional view of the adaptor taken along lines 7—7 of FIG. 6; and FIG. 8 is a cross-sectional view of a U-shaped piston web, piston tube, and piston taken along lines 8—8 of FIG. 3.

Accordingly, FIG. 1 depicts a push-button control mechanism 10 on a gear shift lever 12. Mechanism 10 is connected by an adjustable tensioned woven metallic cable 14 running in a flexible tubular sheath 16 to a vacuum actuator 18. The vacuum actuator is, in turn, connected by a pull rod 20 to an adaptor 22 bolted to an existing clutch actuating arm 24 of an automobile. The existing clutch control cable 26, which is secured to the conventional clutch foot pedal, is also secured to adaptor 22. Vacuum actuator 18 is operated from a vacuum supply 28 by a tube 30 in which a check valve 32 is positioned. The tube is connected to the vacuum source by a manifold connector 34 on the intake manifold 36.

Specifically, push-button control mechanism 10 comprises a knob 38 into which a push-button 40 is slidably received. The button is provided with double V-shaped relieved slots 42 within knob 38. A bell crank 44 is pivoted at 46 to the interior of the knob. One portion 48 of bell crank 44 extends into the slots in button 40, while the other end 50 comprises a U-shaped fork to receive a cable terminal fitting 52 secured to cable 14. Knob 38 is also provided with a threaded hole 54 into which an adjustment screw 56 is received. The adjustment screw has a stepped hole 58 into which cable sheath 16 is received. The length of cable 14 is adjusted by turning of screw 56. As shown in FIG. 2, knob 38 is provided with a square opening 60 which receives a threaded gear shift lever adaptor 62 and is locked to the adaptor by a set screw 64 or other suitable means.

At actuator 18 (see also FIG. 3) cable sheath 16 terminates at a clamp 66 and cable 14 terminates in a cable stop 68 which is received in a doubled slotted end 70 of a proportional arm 72. The proportional arm is pivotably mounted at pivot 76 to a bracket 74 mounted on vacuum actuator 18.

As best shown in FIG. 3, actuator 18 comprises a pair of can halves 78 and 80, sealed at flanges 82. Each can half is provided with axially aligned openings 84 and 86. A piston tube 88 is slidably disposed in openings 84 and 86 on bushings 89 and is sealed within the enclosure by seals 90 and receives a valve stem 92 slidably positioned therein. Arm 72 is pivotally connected to stem 92 and to an inlet elastomeric seal 94. Inlet seal 94 acts as a bellows and abuts a follower land seal 96 on piston tube 88. Thus, seals 94 and 96 form a leader-follower valve 97. A piston 98 is rigidly affixed to tube 88 and a flexible diaphragm 100 seals the piston to the sealed enclosure at can half flanges 82, thus dividing the enclosure into first and second chambers 102 and 104.

Communication from the interior of tube 88 to chamber 104 is afforded by a U-shaped piston web 106 (see also FIG. 8) continuously bonded at positions 107a and 107b, respectively, to tube 88 and piston 98, such as by brazing, to form a channel conduit 108. Web 106 includes a pair of parallelly-positioned legs 109, forming an enclosure about conduit 108 and a pair of flanges 109a. Tube 88 is provided with a pair of spaced holes 110 and 112. Hole 110 provides communication between the inside of the piston tube and chamber 104 through channel 108 in piston web 106 and a hole 114 in piston 98; thus, communication from tube 88 to second chamber 104 is always open.

Communication between chambers 102 and 104 is controlled by another leader-follower valve 115 comprising an elastomeric leader seal 116 secured to valve stem 92 and an annular follower land seal 120 on tube 88. A guide nut 118 threaded to the valve stem affixes seal 116 thereto. Seal 116 is normally spaced from annular land seal 120. Land seal 120 is received by a sealing tube 122 which retains and seals follower land seal 120 to tube 88 by any suitable means, such as an injected seal 124. Piston tube 88 is sealed at its right end by a plug 126 which is provided with a pivot 128 to receive pull rod 20.

Now referring to FIGS. 6 and 7, carburator 28 is normally secured to intake manifold 36 by a pair of flanges 130 and 132. A pair of threaded fasteners, one of which is depicted by stud 134, and nut 135, extend through aligned holes 136 and 138 in the flanges. In the present invention, the normally furnished stud extending through holes 138 is removed and nut 135 is loosened to permit a gasket 140 to be slipped between the flanges 130 and 132. The gasket is provided with a slot 142, as best seen in FIG. 7, which fits about stud 134 and is also opened at 144 between manifold throat 146 and holes 138 to provide communication between the manifold flanges through opening 144 of the gasket and to stud hole 138. A special bolt 148 having a relieved shank 150 fastens a connector cap 152 to flange 132 and also aids to secure the flanges together. To ensure a pressure-tight fitting, bolt 148 is sealed to connector cap 152 and the connector cap is sealed to manifold flange 132 by O-ring seals 154 and 156, respectively. Conduit 30 is secured to cap 152 by a nipple 158 thereon to provide communication from manifold throat 146 to chamber 102.

Referring to FIGS. 1 and 4, spherical end 162 of pull rod 20 is slidably retained in a spherical recess 160 in bell crank adaptor 22. A nut 163 and a bolt 164 through existing clutch lever bell crank arm 24 connects the arm to adaptor 22. The existing clutch control cable 26 is fitted with a compression spring 166 and a cable clamp 168 which preloads and retains the spring on the cable. The cable is slidably received at its end 170 in a hole 172 in adaptor 22 and retained therein by an existing wing nut 174 or other suitable means.

FIG. 5 illustrates an alternative automobile design utilizing a different crank 24' which the present invention is designed to accommodate. As is shown, the connection of crank 24 and 24' is interchanged respectively with wing nuts 174 and 174'. Thus, adaptor 22 fits both designs simply by switching locations between the adaptor fastener and the clutch cable location.

In operation, when the engine is running and prior to depression of button 40, a vacuum is created in normally communicating chambers 102 and 104 of actuator 18 by withdrawal of air through conduit 30 to the intake manifold. As shown in FIGS. 1 and 3, clutch operation is accomplished by depression of gear shift lever push-button 40, causing cable 14 to move in the direction of arrow 176. This movement pivots arm 72 and moves stem 92 toward the left as viewed in FIG. 3, to first close valve 115 by moving and slightly compressing elastomeric leader seal 116 against follower land seal 120 and to seal chamber 102 from chamber 104. Valve 97 does not open immediately because of extension of bellows leader seal 94, due to atmospheric pressure maintaining sealing contact between seals 94 and 96.

Continued movement of stem 92 to the left opens valve 97 by moving bellows leader seal 94 from follower land seal 96, allowing ambient air to flow into chamber 104 through tube 88, hole 110, passageway 108, and hole 114. This air creates a sufficient pressure differential between chambers 102 and 104 to cause piston 98 to move to the left. Simultaneously, tube 88 is also moved to the left and overcomes the force of the clutch mechanism and its springs to actuate to disengage the clutch. If the button is held in position, movement of tube 88 to the left causes follower land seal 96 to abut leader bellows seal 94, at which point air flow to chamber 104 ceases and piston travel stops, consequently maintaining the degree of clutch disengagement stationary.

Release of the button permits the higher pressure in chamber 104 bearing against seal 116 and the atmospheric pressure bearing against seal 94 to open valve 115, thus allowing communication between chambers 102 and 104 through hole 114, channel 108, hole 110, tube 88, and hole 112. The pressures in the two chambers thus tend to equalize, depending upon the extent to which the push-button is released, allowing the clutch springs to move pull rod 20 to the right, also in proportion to the extent of push-button release. Movement of pull rod 20 allows its connected tube 88 to travel to the right until following land seal 120 abuts leader seal 116, at which point movement of tube 88 and the pull rod stops, to hold the position of clutch engagement stationary. Thus, a small button travel provides a large but proportional piston travel and, simultaneously, controls the amount of clutch engagement.

Although the invention has been described with reference to particular embodiments thereof, it should be realized that various changes and modifications may be made therein without departing from the spirit and scope of the invention.

What is claimed is:

1. A supplemental and proportional clutch controller for an internal combustion engine powered vehicle having a manually operated gear shift mechanism, a pedal-operated spring-biased clutch, a clutch-operating pedal, and a carburator and intake manifold connected by a manifold throat, comprising:

a gear shift lever operatively coupled to the manually operated gear shift mechanism, a knob secured to one end of said gear shift lever for control thereof, a push button slidably disposed and movable within a slot in said knob and having double V-shaped slot means at one end thereof within said knob, a bellcrank lever pivotally secured to and within said knob and having a first portion extending into said double V-shaped slot means and a cable receiving portion and a cable secured to said cable receiving portion and a cable sheath enclosing said cable and adjustably secured to said knob, whereby depression of said push button causes movement of said cable towards said knob;

a vacuum actuator comprising a pair of cylindrical cans, each having end walls and mating side walls sealed to one another to form a closed container, said end walls having axially aligned opening means, a piston tube slidably received in said opening means and having first and second ends extending outside of said closed container, said first end defining a first follower land seal and said second end having a connector sealed therein, a pair of bushings and seals disposed in said opening means and about said piston tube, a pair of axially spaced hole means in said tube, a second follower land seal secured to the interior of said piston tube intermediate said hole means, a piston secured to said piston tube within said closed container and comprising a plate having a port therein and extending toward said cylindrical can side walls, a diaphragm sealingly secured to said piston plate and to said cylindrical can side walls to separate, with said piston plate, said closed container into first and second chambers, conduit means secured to said piston tube at one of said hole means and to said plate at said port to provide a communication between the interior of said piston tube and said second chamber, the other of said piston tube hole means communicating with said first chamber, a valve stem disposed within said piston tube and having first and second ends, said first valve stem end extending beyond said first follower land seal on said piston tube, a first leader bellows seal having a first portion affixed and sealed to said first valve stem end and a second portion extending towards and abuttable against said first follower land seal, a second leader seal secured to said valve stem second end abuttable against said second follower land seal of said piston tube in sealing engagement with said second follower land seal to seal said piston tube hole means and consequently said first and second chambers from one another upon movement of said first valve stem end away from said first follower land seal, a bell crank arm pivotally secured to said closed container and having first and second arms, said first ball crank arm secured to said cable and said second bell crank arm secured to said first valve stem end, and said cable sheath secured to said closed container;

a clutch linkage mechanism comprising a pull-rod secured at one end to said connector on said second piston tube end, and a plate having three connector means, a first of said connector means comprising a universal connector securing said pull-rod at its other end to said plate, a second of said connector means comprising means coupling said clutch pedal to said plate, and a third of said connector means securing said plate to said spring-biased clutch; and means for coupling said first chamber to the carburator at the intake manifold comprising an inlet in said first chamber, a conduit secured to said inlet, a check valve positioned in said conduit, and connection means securing said conduit to the carburator at the intake manifold, said connection means comprising flanges respectively on the carburator and the intake manifold, said flanges having opening means for the manifold throat and two pairs of aligned bolt hole means, a gasket sealed between said flanges and having slot means aligned with one pair of said aligned bolt hole means and enlarge opening means extending over said manifold throat opening means and the other pair of said aligned bolt hole means, a cap sealed to said other pair of said aligned bolt hole means in communication with said manifold throat opening means, and a pair of threaded fasteners in said bolt hole means for securing said flanges and cap together, one of said threaded fasteners at the other pair of said aligned bolt hole means being relieved to enable communication between said cap and said gasket opening means and said conduit being secured to said cap.

2. A clutch controller as in claim 1 wherein said conduit means, secured to said piston tube at one of said hole means and to said plate at said port, comprises a curved member having a pair of parallelly positioned legs connected together in a general U-shaped configuration, and a pair of flanges outwardly extending from said legs, said legs increasing in length from said piston tube adjacent said one hole means to said plate at said port and being spaced from one another to continuously contact said piston tube from said one hole means to said plate, said curved member being secured to said piston tube and said plate at all contacting points to stabilize and seal the connection between said plate and said piston tube.

3. A controller as in claim 1 wherein said knob includes a changeable threaded adaptor and locking means to secure said knob to said gear shift lever, said adaptor being configured for any existing threaded termination on said gear shift lever.

4. A clutch controller as in claim 1 wherein said second and third plate connector means are configured to enable exchange of said means coupling said clutch pedal to said plate with said third connector means, thereby accommodating different, but existing, clutch arm configurations.

5. A clutch controller as in claim 1 wherein said second plate connector means includes a biased connection to permit overriding connection to said foot pedal.

6. An actuator for operating a spring-biased clutch in an internal combustion engine having a manually shiftable gear mechanism comprising:
a thrust member coupled to and biased by the clutch;

a first sealed chamber being coupled to a first source establishing a first pressure therein;
a second sealed chamber being couplable to a second source establishing a second source of pressure therein, the first source capable of establishing a pressure less than the second source;
valving means coupled to said thrust member and including first and second valve means having valve seats fixed with respect to one another and elastomeric valve seals therefor and a single flexible connection securing said seals together, said second valve means coupled between said first and second chambers for selective opening and closure therebetween and said first valve means including said single flexible connection for selectively opening and closing communication between said second chamber and said second source, said flexible connection under influence of the second source of pressure maintaining closure of said first valve means during closure of said second valve means, and said valving means movable and selectively positionable to produce differences in the pressures between said first and second chambers and thereby selectively positioning said thrust member; and
means coupled to said valving means for movement thereof.

7. An actuator as in claim 6 further including a check valve coupled between said first chamber and said first source of pressure to maintain the first pressure in at least said first chamber when said first source is at a pressure higher than the pressure in said first chamber.

8. An actuator for operating a spring-biased clutch in an internal combustion engine having a manually shiftable gear mechanism comprising:
a sealed enclosure having a movable piston sealed therein for segregating said enclosure into first and second chambers and means for supplying a pressure to said first chamber negative with respect to said second chamber;
a tube slidably received in said sealed enclosure and secured to said piston and movable therewith, said tube having first and second ends extending outside of said enclosure and connected at one end to the clutch and biased thereby in a first direction and having a pair of opening means respectively communicating with said first and second chambers and third opening means at the other end;
first valve means including a flexible body sealable at said third opening means and coupled to said second chamber for enabling the supply thereto of a first pressure greater than the pressure in said first chamber;
second valve means in said tube comprising a seal yieldably coupled to said first valve means and a valve seat connected between said pair of said opening means and closable by said seal for selectively opening and closing communication between said first and second chambers; and
valve actuating means coupled to said flexible body and to said seal for movement thereof in a direction opposite to the first direction and against the bias of the spring-biased clutch.

9. An actuator as in claim 8 further including a leader valve seal in said first valve means, said leader valve seal coupled to and actuated by said activating means and initiating movement of said tube and said second valve seal in proportionate response to movement of said actuating means to proportionally engage and disengage said clutch.

10. An actuator as in claim 8 wherein said first valve means includes a valve seat on said tube at said third opening means and a seal terminating said flexible body, and said first and second valve means include a valve stem having and seals secured thereto, said seal terminating said flexible body defining bellows means to maintain closure of said first valve means under the first pressure during closing and opening of said second valve means.

11. An actuator as in claim 8 wherein said first chamber is coupled to a carburetor intake manifold and said second chamber is couplable to the ambient environment external to said sealed enclosure.

12. An actuator as in claim 11 further including coupling means coupling said first chamber to said intake manifold of a carburetor, said coupling means comprising flanges respectively on said carburetor and said intake manifold, said flanges having opening means for the manifold throat and two pairs of aligned bolt hole means, a gasket sealed between said flanges and having opening means relieved between the manifold throat and a first pair of said aligned bolt hole means, to provide communication between the manifold throat and said first pair of aligned bolt hole means, said gasket further having U-shaped slotted means extending about a second pair of said aligned bolt hole means to facilitate installation of said gasket between said flanges, and fastening means extending through said bolt hole means.

13. An actuator as in claim 8 wherein each of said valve means includes a leader valve seal and a follower valve seal closable against said leader valve seal in response to movement thereof.

14. An actuator as in claim 8 further including a gear shift lever connected to the gear mechanism, said valve actuating means being on said gear shift lever.

* * * * *